(12) United States Patent
Farr

(10) Patent No.: US 7,400,458 B2
(45) Date of Patent: Jul. 15, 2008

(54) IMAGING OPTICS WITH WAVELENGTH DEPENDENT APERTURE STOP

(75) Inventor: Mina Farr, Palo Alto, CA (US)

(73) Assignee: Philips Lumileds Lighting Company, LLC, San Jose, CA (US)

(*) Notice: Subject to any disclaimer, the term of this patent is extended or adjusted under 35 U.S.C. 154(b) by 349 days.

(21) Appl. No.: 11/203,043

(22) Filed: Aug. 12, 2005

(65) Prior Publication Data

US 2007/0035852 A1    Feb. 15, 2007

(51) Int. Cl.
*G02B 9/00* (2006.01)
*G02B 27/44* (2006.01)
*G02B 3/00* (2006.01)
*G02B 5/28* (2006.01)
*H04N 5/225* (2006.01)

(52) U.S. Cl. .............. 359/738; 359/723; 359/565; 359/589; 359/686; 359/684; 359/784; 359/791; 348/342; 348/781; 348/240.3; 348/357; 355/53; 250/550

(58) Field of Classification Search ............ 359/24, 359/31, 738, 614, 565, 576, 676, 680, 686, 359/791, 684, 432, 689, 726, 386, 346, 784, 359/785, 577, 723, 589; 348/240.3, 218.1, 348/342, 357, 335, 340, 279, 341, 368, 373, 348/222.1, 240.99, 360, 676, 363, 781, 786, 348/E5.025, E5.028; 250/550, 226, 338.1, 250/352; 378/34, 35; 355/53, 46; 372/98, 372/101, 103, 107; 353/20, 32, 34

See application file for complete search history.

(56) References Cited

U.S. PATENT DOCUMENTS

| | | | | |
|---|---|---|---|---|
| 3,247,467 A * | 4/1966 | Geusic et al. | ................ | 372/98 |
| 3,546,469 A * | 12/1970 | Lehovec | ................ | 250/550 |
| 4,454,535 A * | 6/1984 | Machida | ................ | 348/781 |
| 4,687,926 A * | 8/1987 | Plummer | ................ | 250/226 |
| 5,148,209 A * | 9/1992 | Subbarao | ................ | 396/93 |
| 5,231,443 A * | 7/1993 | Subbarao | ................ | 396/93 |
| 5,280,388 A * | 1/1994 | Okayama et al. | ............ | 359/569 |
| 5,627,626 A * | 5/1997 | Inoue et al. | ................ | 355/67 |
| 6,034,372 A * | 3/2000 | LeVan | ................ | 250/352 |
| 6,040,857 A * | 3/2000 | Hirsh et al. | ................ | 348/241 |
| 6,101,034 A * | 8/2000 | Cox et al. | ................ | 359/562 |
| 6,808,269 B2 | 10/2004 | Cobb | ................ | 353/31 |
| 7,046,460 B2 * | 5/2006 | Nozawa | ................ | 359/791 |
| 7,268,945 B2 * | 9/2007 | Yun et al. | ................ | 359/565 |

* cited by examiner

*Primary Examiner*—Loha Ben

(57) ABSTRACT

An imaging system includes a wavelength dependent aperture stop, which transmits light with different ranges of wavelengths through apertures of different diameters. Thus, different colored light will have different F-stops, which can be selected based on the power transfer and image quality requirements for the different colored light. For example, a smaller F-stop may be used with a weaker light source to produce a higher throughput for a specific range of wavelengths. Accordingly, the optical system's design and optimization is wavelength and F-stop dependent.

28 Claims, 2 Drawing Sheets

IMAGING OPTICS WITH WAVELENGTH DEPENDENT APERTURE STOP

FIELD OF THE INVENTION

The present invention is related to imagining optics and in particular to an optical system with an aperture stop that transmits light through apertures having different diameters based on the wavelength of the light.

BACKGROUND

In imaging system design, such as for a projection system, it is necessary to correct for aberrations to improve image quality while maximizing the light throughput of the system to increase brightness. Conventionally, in a chromatic coaxial optical system, i.e., where all wavelengths of light are transmitted along a common optical system, the imaging optics are designed and optimized based on common optical elements for all wavelengths. In other words, conventional optical systems are designed with all wavelengths of light passing through the same lenses and aperture stops.

Difficulty arises in the design and optimization of optical systems because different wavelengths of light have different optical path lengths through the optical system based on their wavelength. Thus, an optical system transfer function could be different for any specific wavelength causing the system modulation transfer functions (MTF) to be wavelength dependent as well. The optimization of the MTF for one color in an optical system generally results in the degradation of the MTF for other colors, same as the optimization of one field point generally results in the degradation of the MTF for the other field points. Accordingly, compromise is generally necessary in the design and optimization of an imaging system, among different wavelengths as well as different field points.

The design of optical systems is further complicated where independent color light sources, such as light emitting diodes (LEDs) are used. The throughput of an optical system is defined by the extent of the aperture stop without any vignetting, i.e., no ray in the optical system is cut off along the optical train. Because some color light sources may be brighter than others, and because the throughput of the system is conventionally designed to be equal for all wavelengths, weaker light sources stay relatively weak at the output of the optical system. Accordingly, the optical design in imaging systems using multiple light sources is typically limited to a choice of optical elements and transmitting apertures that will provide adequate throughput for all wavelengths.

SUMMARY

An imaging system, in accordance with an embodiment of the present invention, includes a wavelength dependent aperture stop that transmits light with different wavelengths through apertures of different diameters. Accordingly, different colored light will have different F-stops, which can be selected based on, e.g., the power transfer requirements for the different wavelengths. For example, a smaller F-stop may be used with a weaker light source to produce a higher throughput for a specific range of wavelengths, while a larger F-stop is used with a different range of wavelengths.

In accordance with one embodiment, an apparatus includes a light source that produces light that impinges on an object to be imaged with multiple wavelengths along an optical axis and a wavelength dependent aperture stop positioned along the optical axis in the path of the light. The wavelength dependent aperture stop has a first aperture of a first diameter through which a first range of wavelengths is transmitted and a second aperture of a second diameter through which a second range of wavelengths is transmitted. The second diameter is larger than the first diameter. The apparatus further includes at least one imaging lens positioned along the optical axis in the path of the light produced by the light source to produce an image, where the wavelength dependent aperture stop is positioned between the object and the image produced by the imaging lens. The second range of wavelengths may be a subset of the first range of wavelengths. In some embodiments, the wavelength dependent aperture stop may have additional apertures, such as a third aperture of a third diameter through which a third range of wavelengths is transmitted, where the third diameter is greater than the second diameter.

In another embodiment, a method includes producing polychromatic light along an optical axis, transmitting a first range of wavelengths from the polychromatic light through a first aperture in an aperture stop and transmitting a second range of wavelengths from the polychromatic light through a second aperture that is in the aperture stop. The first and second apertures are concentric. The first aperture has a first diameter and the second aperture has a second diameter that is greater than the first diameter. The method further includes projecting the light that is transmitted through the first aperture and the second aperture in the aperture stop onto an image plane. In one aspect, the method further includes transmitting a third range of wavelengths from the polychromatic light through a third aperture that is in the aperture stop and that is concentric with the first aperture, where the third aperture has a third diameter that is greater than the second diameter.

Another embodiment is an imaging apparatus that includes a light source that produces polychromatic light along an optical axis and an aperture stop and at least one optical lens positioned along the optical axis. The aperture stop has different diameter apertures through which different ranges of wavelengths are transmitted and the at least one optical lens defines a focal length for the imaging apparatus, such that there is a first F-stop for a first range of wavelengths and a second F-stop for a second range of wavelengths. The second F-stop is smaller than the first F-stop. Additional F-stops may be used, such as a third F-stop for a third range of wavelengths, where the third F-stop is smaller than the second F-stop.

DETAILED DESCRIPTION

Figure 1:
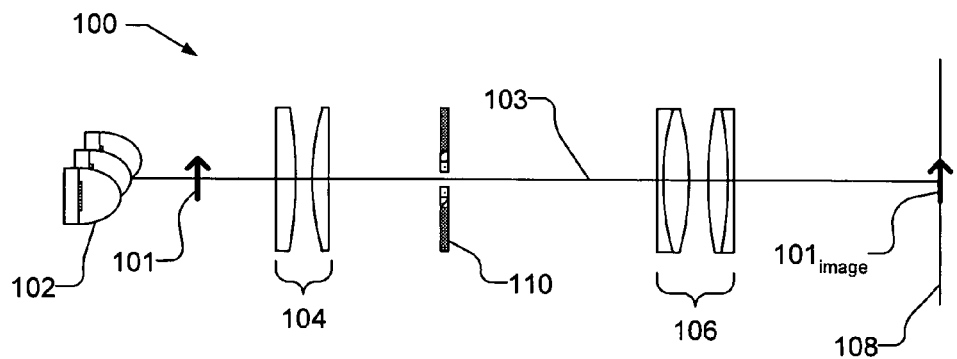
FIG. 1 illustrates an optical system with a wavelength dependent aperture stop.

FIG. 1 illustrates an optical system 100, such as a projection system, that includes a wavelength dependent aperture stop 110, in accordance with an embodiment of the present invention. Optical system 100 includes a light source 102 that produces polychromatic light along optical axis 103. The light source 102 may be a number of light emitting diodes (LEDs), as illustrated in FIG. 1, which emit, e.g., red, green and blue light, which are combined with appropriate optics (not shown). Alternatively, a single LED that emits white light, e.g., through phosphor conversion, may be used. Other light sources may be used with the present invention if desired. As illustrated in FIG. 1, the light from the light source 102 is transmitted through (or reflected from) an object 101, such as a micro-display, where the projection system optics consisting of lenses 104, aperture 110 and lenses 106, image $101_{image}$ of the object 101 on the screen or viewing plane 108. Aperture 110 is positioned at the aperture stop of the optical system consisting of projection optics 104 and 106.

It should be understood that the optical system 100 shown in FIG. 1 is one example of an optical system with which the wavelength dependent aperture stop 110 may be used. Except for the wavelength dependent aperture stop 110, the general operation of an optical system, such as that shown in FIG. 1, is readily understood in the art. If desired, the wavelength dependent aperture stop 110 may be used with other optical systems as would be understood by those skilled in the art in light of the present disclosure.

The use of the wavelength dependent aperture stop 110 enables the diameter of the aperture through which light is transmitted to vary as a function of wavelength. Thus, with the focal length defined by the lens systems and the use of different diameter apertures for different wavelengths, the optical system 100 has different F-stops for different wavelengths of light. By way of example, a smaller F-stop may be used for the wavelengths of light for which a higher throughput is desired, e.g., where the wavelengths are produced by a weak light source or where additional brightness is desired for the wavelengths. Consequently, larger numerical aperture rays pass through the optical system, increasing the etendue of the system. As is known in the art, etendue is an optical extent of the light passing through an optical system (proportional to the product of the image area and the numerical aperture) and for an etendue limiting optical system, the f# (inversely proportional to the numerical aperture stop) is an indication of the limiting etendue, or the amount of light that can be handled by an optical system; a larger etendue generally corresponds to a brighter optical system.

Thus, according to an embodiment of the present invention, the F-stop, i.e., throughput, for different wavelengths of light, or the etendue of the optical system can be optimized for different wavelengths, e.g., based on the different power transfer requirements. Moreover, based on the numerical aperture for each wavelength, the new color dependent error functions can be used to optimize the optical system in terms of image quality and aberrations.

Figure 2A:
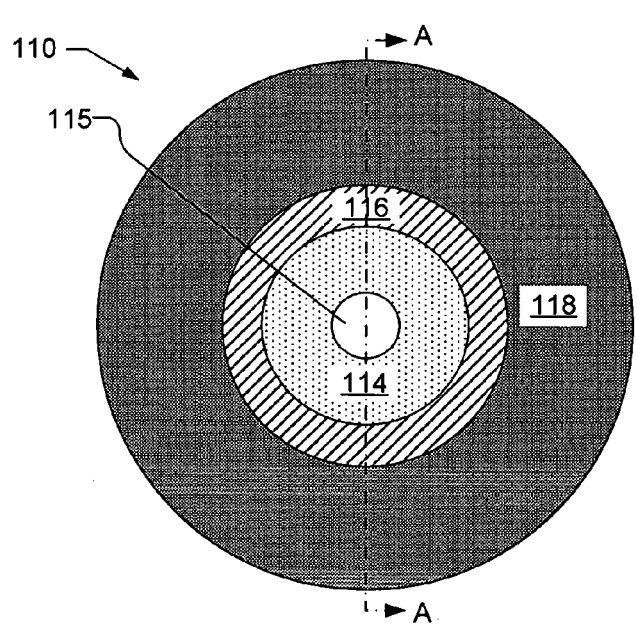
FIGS. 2A and 2B illustrate a plan view and a cross-sectional view, respectively, of a wavelength dependent aperture stop, in accordance with an embodiment of the present invention.
Figure 2B:
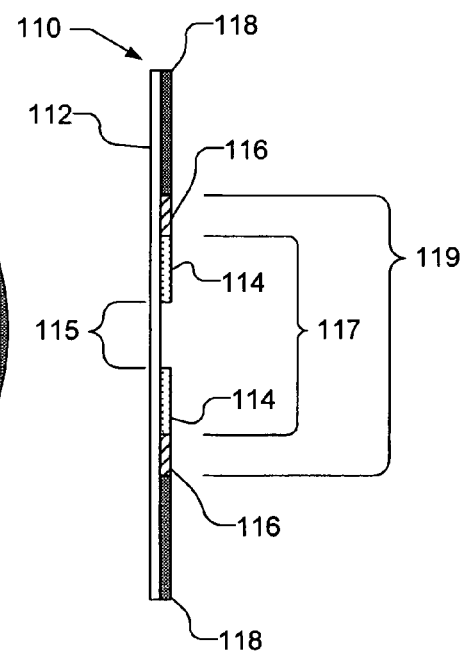

FIGS. 2A and 2B illustrate a wavelength dependent aperture stop 110, in accordance with an embodiment of the present invention, in a plan view and a cross-sectional view (along lines A-A of FIG. 2A), respectively. Aperture stop 110 includes a transparent plate 112 that is covered with two ring shaped transmission filters 114 and 116 and an opaque film 118, where the filters 114 and 116, e.g., thin film coatings that are appropriately deposited on plate 112. The inner diameter of transmission filter 114 defines a circular aperture 115 through which all wavelengths of light may pass. The inner diameter of transmission filter 116 defines a circular aperture 117 and the inner diameter of opaque film 118 defines a circular aperture 119. The circular apertures 115, 117, and 119 are configured to be concentric. In operation, aperture 115 (in FIGS. 2A and 2B) permits all desired wavelengths of light to pass through, while ring shaped transmission filters 114 and 116 permit only specific ranges of wavelengths to pass through and opaque member 118 does not permit any light to pass through.

Figure 3A:
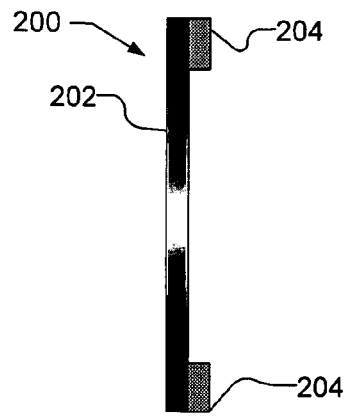
FIGS. 3A and 3B are cross-sectional views of other embodiments of a wavelength dependent aperture stop.

It should be understood that other wavelength dependent aperture constructions may be used if desired. By way of example, other embodiments may have multiple wavelength dependent apertures where the filters are more narrow band filters for specific wavelength ranges of the light. In another embodiment, the aperture boundaries could present a more gradual variation of the filter transmission over the wavelength, e.g., using a varying transmission filter, rather than an abrupt boundary between different wavelength transmission functions. For example, as shown in FIG. 3A, an aperture stop 200 may include a varying transmission filter 202 that provides a gradually diminishing aperture diameter that is dependent on the wavelength of the light and an opaque member 204 that passes no light.

Figure 3B:
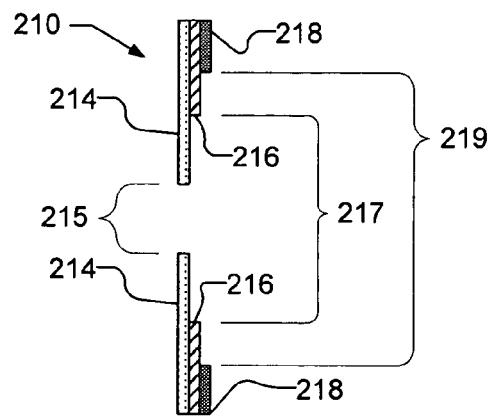

Moreover, the wavelength dependent aperture stop may be produced using alternative configurations. For example, FIG. 3B illustrates, in cross-sectional view, an aperture stop 210 that is formed with overlapping transmission filters 214, 216 and an opaque member 218, thereby obviating the need for a transparent plate 102 and providing at least one aperture opening with a transmission function that is a product of two or more overlapping color filters. The transmission filters 214, 216, and opaque member may partially or fully overlap. In one embodiment, transmission filters 214, 216 and opaque member 218 have concentric circular apertures 215, 217, and 219, respectively. With such as configuration, transmission filters 214 and 216 will have ring shapes resulting in the plan view shown in FIG. 2A. Other possible configurations to produce wavelength dependent aperture stop will be clear to those skilled in the art in light of the present disclosure.

Figure 4:
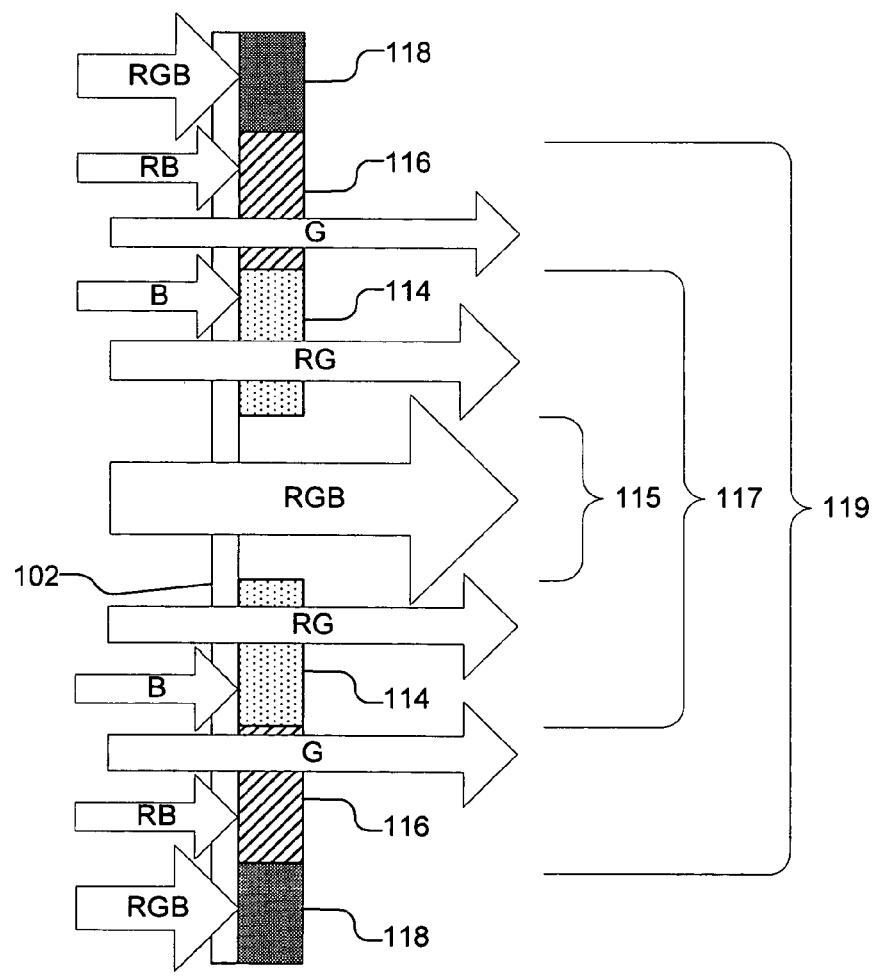
FIG. 4 graphically illustrates the operation of a wavelength dependent aperture stop.

FIG. 4 graphically illustrates the operation of wavelength dependent aperture stop 110, in which transmission filter 114 blocks blue light and transmit both green and red light, while transmission filter 116 blocks red and blue light and pass only green light, and opaque element 118 blocks the red, green and blue light. Accordingly, green light will pass through aperture 115 and transmission filters 114 and 116 and, therefore, has an F-stop defined by the diameter of aperture 119 in the opaque film 118. Red light will only pass through aperture 115 and only transmission filter 114 and, therefore, has an F-stop defined by the diameter of aperture 117 in transmission filter 116. Blue light will pass through only aperture 115 and, therefore, has an F-stop defined by diameter of aperture 115. In such an embodiment, green light has a smaller F-stop, and therefore greater throughput, than red or blue light, while red light has a smaller F-stop than blue light.

The particular design of aperture stop 110 may depend on the requirement of the optical system, e.g., the power transfer requirements of the light sources and/or the required chromatic final image quality. Thus, transmission filters 114 and 116 may transmit any desired range of wavelengths. Moreover, if desired, fewer or additional transmission filters may be used with the wavelength dependent aperture stop. For example, only a single transmission filter may be used, e.g., transmission filter 114, with the opaque element. In such a configuration, the single transmission filter may transmit one range of wavelengths, e.g., green light or green and red light, while the remaining wavelengths of light are transmitted only through the unfiltered aperture, i.e., aperture 115. In another embodiment, additional transmission filters may be used for smaller ranges of wavelengths, e.g., additional transmission filters may be used to provide different sized apertures for different colors, such as blue, cyan, green, amber and red.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus comprising:
   a light source that produces light along an optical axis, the light having multiple wavelengths;
   a wavelength dependent aperture stop positioned along the optical axis in the path of the light produced by the light source impinging on an object to be imaged, the wavelength dependent aperture stop having a first aperture of a first diameter through which a first range of wavelengths is transmitted and a second aperture of a second diameter through which a second range of wavelengths is transmitted, wherein the second diameter is larger than the first diameter; and
   at least one imaging lens positioned along the optical axis in the path of the light produced by the light source that produces an image of the object, wherein the wavelength dependent aperture stop is positioned between the object to be imaged and the image produced by the at least one imaging lens.

2. The apparatus of claim 1, wherein the first aperture is defined by a transmission filter and the second aperture is defined by an opaque element, wherein the transmission filter and first aperture are inside the second aperture and the transmission filter transmits light in the second range of wavelengths and blocks light having wavelengths outside the second range of wavelengths.

3. The apparatus of claim 2, wherein the second range of wavelengths is a subset of the first range of wavelengths.

4. The apparatus of claim 2, wherein the transmission filter has a ring shape defined by the first aperture and the second aperture of the opaque element when viewed from a direction parallel to the optical axis.

5. The apparatus of claim 2, the wavelength dependent aperture stop further comprises a transparent element, wherein the transmission filter and the opaque element are mounted on the transparent element.

6. The apparatus of claim 2, wherein the transmission filter is mounted on the opaque element such that at least a portion of the transmission filter and the opaque element overlap.

7. The apparatus of claim 1, wherein the wavelength dependent aperture stop has a plurality of apertures each having a different diameter through which different ranges of wavelengths are transmitted.

8. The apparatus of claim 7, wherein the wavelength dependent aperture stop comprises at least one varying transmission filter that provides a gradually diminishing aperture diameter that is dependent on the wavelength.

9. The apparatus of claim 1, wherein the wavelength dependent aperture stop has a third aperture of a third diameter through which a third range of wavelengths is transmitted, wherein the third diameter is greater than the second diameter.

10. The apparatus of claim 9, wherein the first aperture is defined by a first transmission filter, the second aperture is defined a second transmission filter, and the third aperture is defined by an opaque element wherein the first transmission filter and second transmission filter are inside the third aperture, and the first transmission filter is inside the second aperture, the first aperture transmits light in the second range of wavelengths and blocks light having wavelengths outside the second range of wavelengths and the second transmission filter transmits light in the third range of wavelengths and blocks light having wavelengths outside the third range of wavelengths.

11. The apparatus of claim 10, wherein the third range of wavelengths is a subset of the second range of wavelengths and the second range of wavelengths is a subset of the first range of wavelengths.

12. The apparatus of claim 10, wherein the first transmission filter has a ring shape defined by the first aperture and the second aperture in the second transmission filter, and the second transmission filter has a ring shape defined by the second aperture and the third aperture in the opaque element.

13. The apparatus of claim 1, wherein the light source comprises one or more light emitting diodes.

14. The apparatus of claim 1, further comprising at least one lens element that is positioned between the wavelength dependent aperture stop and the object to be imaged.

15. A method comprising:
   producing polychromatic light along an optical axis that is impinging on an object to be imaged;
   transmitting a first range of wavelengths from the polychromatic light through a first aperture in an aperture stop and transmitting a second range of wavelengths from the polychromatic light through a second aperture that is in the aperture stop and that is concentric with the first aperture, the first aperture having a first diameter and the second aperture having a second diameter that is greater than the first diameter; and
   projecting the light that passes through the first aperture and the second aperture in the aperture stop onto an image plane to produce an image of the object.

16. The method of claim 15, wherein the second range of wavelengths is a subset of the first range of wavelengths.

17. The method of claim 15, further comprising transmitting a third range of wavelengths from the polychromatic light through a third aperture that is in the aperture stop and that is concentric with the first aperture, the third aperture having a third diameter that is greater than the second diameter.

18. The method of claim 17, wherein the third range of wavelengths is a subset of the second range of wavelengths and the second range of wavelengths is a subset of the first range of wavelengths.

19. The method of claim 15, wherein producing polychromatic light comprises emitting light from one or more light emitting diodes.

20. The method of claim 15, further comprising optically processing the polychromatic light prior to the polychromatic light passing through the aperture stop.

21. An imaging apparatus comprising:
   a light source that produces polychromatic light along an optical axis;
   an aperture stop positioned along the optical axis in the path of the polychromatic light produced by the light source impinging on an object to be imaged, wherein the aperture stop has different diameter apertures through which different ranges of wavelengths are transmitted;
   at least one optical lens positioned along the optical axis to project an image of the object;
   wherein the at least one optical lens defines a focal length for the imaging apparatus and wherein the different diameter apertures in the aperture stop and the focal length define a first F-stop for a first range of wavelengths and a second F-stop for a second range of wavelengths, the second F-stop being smaller than the first F-stop.

22. The imaging apparatus of claim 21, wherein the aperture stop comprises a transmission filter having a first aperture and an opaque element having a second aperture, the transmission filter being inside the second aperture and the first aperture and second aperture being concentric, wherein the transmission filter transmits light having the second range of wavelengths and blocks light having wavelengths outside the second range of wavelengths.

23. The imaging apparatus of claim 21, wherein the second range of wavelengths is a subset of the first range of wavelengths.

24. The imaging apparatus of claim 21, wherein the different diameter apertures in the aperture stop and the focal length further define a third F-stop for a third range of wavelengths, the third F-stop being smaller than the second F-stop.

25. The imaging apparatus of claim 24, wherein the aperture stop comprises a first transmission filter having a first aperture, a second transmission filter having a second aperture and an opaque element having a third aperture, the first transmission filter and second transmission filter being inside the third aperture, the first transmission filter being inside the second aperture, and the first aperture, second aperture and third aperture are concentric, wherein the first transmission filter transmits light having the second range of wavelengths and blocks light having wavelengths outside the second range of wavelengths and the second transmission filter transmits light having the third range of wavelengths and blocks light having wavelengths outside the third range of wavelengths.

26. The imaging apparatus of claim 25, wherein third range of wavelengths is a subset of second range of wavelengths, and wherein the second range of wavelengths is a subset of the first range of wavelengths.

27. The imaging apparatus of claim 21, wherein the light source is one or more light emitting diodes.

28. The imaging apparatus of claim 21, wherein the aperture stop comprises at least one varying transmission filter that provides gradually diminishing aperture diameters that are dependent on the wavelength, wherein the gradually diminishing aperture diameters and the focal length define a plurality of F-stops that are dependent on wavelength.

* * * * *